United States Patent [19]
Chin et al.

[11] Patent Number: 6,163,543
[45] Date of Patent: *Dec. 19, 2000

[54] PORT AGGREGATION PROTOCOL

[75] Inventors: Hon Wah Chin, Palo Alto; Michael Fine, San Francisco; Norman W. Finn, San Jose; Richard J. Hausman, Soquel, all of Calif.

[73] Assignee: Cisco Technology, Inc., San Jose, Calif.

[ * ] Notice: This patent is subject to a terminal disclaimer.

[21] Appl. No.: 09/312,702

[22] Filed: May 17, 1999

Related U.S. Application Data

[63] Continuation of application No. 08/902,638, Jul. 30, 1997, Pat. No. 5,959,968.

[51] Int. Cl.[7] .................................................. H04L 12/28
[52] U.S. Cl. ...................... 370/400; 370/401; 370/216
[58] Field of Search .................................. 370/400, 401, 370/402, 403, 404, 405, 352, 355

[56] References Cited

U.S. PATENT DOCUMENTS

| | | | |
|---|---|---|---|
| 5,274,631 | 12/1993 | Bhardwaj | 370/401 |
| 5,561,669 | 10/1996 | Lenney | 370/352 |
| 5,617,421 | 4/1997 | Chin | 370/402 |
| 5,734,824 | 3/1998 | Choi | 370/405 |
| 5,764,895 | 6/1998 | Chung | 370/402 |

*Primary Examiner*—Douglas W. Olms
*Assistant Examiner*—Ricardo M. Pizarro
*Attorney, Agent, or Firm*—Cesari and McKenna, LLP

[57] ABSTRACT

A port aggregation protocol (PAGP) dynamically aggregates redundant links between two neighboring devices in a computer network through the exchange of aggregation protocol data unit (AGPDU) frames between the two devices. Each AGPDU frame contains a unique identifier corresponding to the device sourcing the frame and a port number corresponding to the port through which the frame is forwarded. The exchange of AGPDU frames and the information contained therein allows the neighboring devices to identify those ports corresponding to the redundant links. Each device then dynamically aggregates its ports corresponding to the redundant links into a logical aggregation port (agport) which appears as a single, high-bandwidth port or interface to other processes executing on the device.

17 Claims, 6 Drawing Sheets

| EVENTS | IDLE | TRANSMISSION | LINKED | AVAILABLE | AGGREGATED |
|---|---|---|---|---|---|
| E0 - PHYSICAL PORT IS/BECOMES INOPERABLE | IDLE | IDLE | IDLE | IDLE | IDLE |
| E1 - PHYSICAL PORT IS/BECOMES OPERATIONAL | TRANS. | | | | |
| E2 - NON-AGPDU FRAMES (E.G. DATA FRAMES) ARE RECEIVED | | TRANS. | LINKED | AVAILABLE | AGGREGATED |
| E3 - NO AGPDU FRAMES RECEIVED AFTER WAITING SUFFICIENT TIME | | TRANS. | | | |
| E4 - AN AGPDU FRAME IS RECEIVED | | LINKED | LINKED | | |
| E5 - INFORMATION IN PARTNER TABLE IS STABLE AND PROVES BI-DIRECTIONAL CONN. WITH EXACTLY ONE NEIGH. DEVICE | | | AVAILABLE | AVAILABLE | AGGREGATED |
| E6 - ALL INFORMATION IN PARTNER TABLE TIMES - OUT (AGPDU FRAMES NO LONGER RECEIVED) | | | TRANSMISSION | TRANSMISSION | TRANSMISSION |
| E7 - ANOTHER PORT COUPLED TO SAME DEVICE AND IN AVAIL. STATE IS IDENTIFIED | | | | AGGREGATED | |
| E8 - AN AGPDU FRAME IS REC. ED FROM A SECOND NEIGHBORING DEVICE | | | LINKED | LINKED | LINKED |
| E9 - ALL BUT ONE ENTRY IN THE PARTNER TABLE TIMES OUT | | | | AVAILABLE | |
| E10 - AN AGPDU FRAME IS RECEIVED CONTAINING DIFFERENT INFO. FROM PRIOR AGPDU FRAMES | | | LINKED | LINKED | LINKED |

INITIAL STATE

FIG. 5B

PORT AGGREGATION PROTOCOL

This is a continuation of U.S. patent application Ser. No. 08/902,638, filed Jul. 30, 1997 now U.S. Pat. No. 5,959,968.

FIELD OF THE INVENTION

The present invention relates generally to computer networks and, more specifically, to a protocol for aggregating redundant links in a computer network.

BACKGROUND OF THE INVENTION

Many organizations, including businesses, governments and educational institutions, utilize computer networks so that employees and others may share and exchange information and/or resources. A computer network typically comprises a plurality of entities interconnected by means of one or more communications media. An entity may consist of any device, such as a computer, that "sources" (i.e., transmits) or "sinks" (i.e., receives) data frames over the communications media. A common type of computer network is a local area network ("LAN") which typically refers to a privately owned network within a single building or campus. LANs typically employ a data communication protocol (LAN standard), such as Ethernet, FDDI or token ring, that defines the functions performed by data link and physical layers of a communications architecture (i.e. a protocol stack). In many instances, several LANs may be interconnected by point-to-point links, microwave transceivers, satellite hook-ups, etc. to form a wide area network ("WAN") or subnet that may span an entire country or continent.

One or more intermediate devices is often used to couple LANs together and allow the corresponding entities to exchange information. For example, a switch may be utilized to provide a "switching" function for transferring information, such as data frames, among entities of a computer network. Typically, the switch is a computer and includes a plurality of ports that couple the switch to the other entities. The switching function includes receiving data at a source port from an entity and transferring that data to at least one destination port for receipt by another entity.

Another network device is referred to as a router. A router is typically used to interconnect LANs executing different LAN standards and/or to provide higher network functionality, such as efficient message routing. To perform these tasks, a router, which is also often a computer, typically examines and may modify the destination address and source address of all packets passing through the router. Routers typically operate at the network layer of the protocol stack, such as the Internet Protocol of the Transmission Control Protocol/Internet Protocol ("TCP/IP") reference model. If the LAN standards associated with the source entity and the destination entity are dissimilar (e.g., Ethernet versus Token Ring), the router may alter the format of the packet so that it conforms with the standard corresponding to the destination entity.

FIG. 1 illustrates a conventional computer network 100 comprising a plurality of local area networks (LANs) 101–108 that are interconnected by a plurality of switches 111–118 and routers 121–123. More specifically, each LAN 101–108 is preferably coupled to at least one port 124 of switches 111–118. One or more entities (not shown) for sourcing or singling data frames are preferably coupled to each LAN 101–108. The switches 111–118 and routers 121–123 are interconnected by a series of links 126, such as point-to-point links. Links 126 also couple to ports 124 of the switches 111–118 and routers 121–123. Each switch 111–118 and router 121–123, moreover, may individually identify its ports, e.g., by numbers one, two, three, etc. Accordingly, each switch 111–118 and router 121–123 may associate a given port with the particular LAN, switch or router coupled thereto. For example, switch 111 may associate its port number one with LAN 101, port numbers two and three with router 121, port number four with switch 112 and port number five with LAN 102.

The network 100 may also include devices for providing services to the entities. For example, network 100 preferably includes a file server 128. The file server 128 may be connected to router 121 by two links 126. Separate ports 124 (e.g., port numbers one and two) at the file server 128 may be associated with each of the links 126. Thus, data frames may be forwarded by router 121 over either link 126 for receipt by the file server 128.

Like most computer networks, network 100 includes redundant communications paths so that a failure of any given link does not isolate any portion of the network 100. For example, switch 111 is connected to router 121 by two links 126. Thus, in the event one of these links 126 fails, communication between switch 111 and router 121 may continue through the other link 126. Similarly, routers 122 and 123 are interconnected by multiple links 126 as are router 121 and the file server 128. The existence of redundant links, however, can introduce significant problems in the network 100.

For example, file server 128 may have a different address associated with each of its ports 124, i.e., port numbers one and two. These addresses are used by entities on LANs 101–108 when communicating with the file server 128, e.g., requesting services. The entities, however, may not be aware of both addresses. That is, entities located on LANs 103 and 104 may only be aware of the address of the file server 128 that corresponds to its port number one whereas, entities on LANs 101 and 102 may only be aware of the file server 128 through its address corresponding to port number two. Accordingly, if one of the links 126 that connects the file server 128 with router 121 were to fail, certain entities may be unable to access the file server 128. For example, if the link 126 associated with port number one of the file server 128 were to fail, entities on LANs 103 and 104 would no longer be able to communicate with the file server 128, even though the adjacent link between the file server 128 and router 121 (i.e., the link coupled to port number two of the file server 128) is still functioning. That is, messages addressed to port number one of the file server 128 (which is the only address known by entities on LANs 103 and 104) cannot be delivered by router 121, due to the failure of the link corresponding to that port.

One solution to this problem is for router 121 to inform entities on LANs 103 and 104 to address the file server 128 at its port number two following a link failure. This requires router 121 to constantly monitor the availability of both links 126 coupled to the file server 128. In addition, the router 121 must transmit access messages to each entity on LANs 103 and 104 in the event of a failure of the link. This activity consumes substantial system resources. In addition, some amount of time is required for the access messages from router 121 to reach the entities on LANs 103 and 104, during which time messages addressed to the file server 128 via port number one may still be lost.

The existence of redundant links may also cause the formation of circuitous paths or "loops" within the network 100. Loops are highly undesirable because data frames may traverse the loops indefinitely. Furthermore, as a frame travels along a loop, some devices, such as switches 111–118, may become so "confused" as to the location of the entity sourcing the frame as to actually proliferate these "looping" data frames. That is, switches 111–118 may create additional copies of these looping frames. The resulting traffic may effectively "shut-down" the network 100. Intermediate devices, such as routers 121–123, that operate at higher hierarchical layers (e.g., the network layer) within the protocol stack, deliver data frames and learn the addresses of entities on the network differently than switches 111–118, such that routers are generally not susceptible to sustained looping problems.

To avoid the formation of loops, intermediate devices, such as switches, within each segment of the network execute what is known as a spanning tree algorithm. This algorithm effectively "severs" the redundant links within the network segments. More specifically, switches exchange special messages called bridge protocol data unit (BPDU) frames that allow them to calculate a spanning tree, which is a subset of the network segment that is loop-free (i.e., a tree) and yet connects every pair of LANs within the segment (i.e., the tree is spanning). The BPDU frames contain sufficient information, such as the relative cost of transmitting data frames over the links and interconnecting LANs, for the switches to discover a loop-free tree. Using this information, the switches calculate the tree in accordance with the algorithm and typically elect to sever or block all but one of the redundant links or communications paths. The spanning tree algorithm and the BPDU messages are well-known and documented (see IEEE Standard 802.1D).

Switches place each port corresponding to a severed link 126 in a blocking mode. When a port is in the blocking mode, the associated switches will not forward any data frames to or from that port. The ports corresponding to the remaining communications paths or links are placed in aforwarding mode so that data frames may be forwarded to and from those ports and thus onto the corresponding paths or links.

In general, switches learn the locations of entities by examining the source addresses of received data frames and maintain this information in a filtering database. Pursuant to the spanning tree protocol, a change in network topology (e.g., the failure or recovery of a link) typically causes the switches to time out the information in the filtering database. As a result, after the spanning tree determines which ports should be placed in the blocking or forwarding modes under the new network topology, data frames must be initially flooded while the bridges re-learn the locations of entities. Significant communications bandwidth and time are thus often consumed during reconfigurations. Higher layer protocols, such as file, transfer applications or network log ons, may similarly time out while the spanning tree protocol attempts to stabilize under the new topology resulting in further inefficiencies.

As shown in FIG. 1, four network segments exist, including: (1) switches 111 and 112; (2) 113; (3) 114–116; and (4) 117 and 118 and thus an independent spanning tree algorithm runs in each segment. A loop, moreover, exits in the segment comprising switches 111 and 112 by virtue of the connections through LAN 102 and link 126 extending between the two switches. Execution of the spanning tree algorithm in this segment may result in switch 111 placing its port number five in the blocking state (as illustrated by the 'X'), thereby avoiding the loop. Switch 111 will not forward any data frames arriving on port number five or forward any data frames through that port. Loops also exist in the segments comprising switches 114 and 115 and 117 and 118. Execution of the spanning tree algorithms in these segments may result in switch 114 placing its port two in the blocking mode and switches 115 and 118 placing their ports two and one, respectively, in the blocking mode.

Since the spanning tree algorithms essentially block all but one of the redundant links between two looped devices, all of the data frames exchanged between those devices must be carried on the single link or path corresponding to the one port placed in the forwarding mode. No data may be exchanged over the links or paths associated with blocked ports. Thus, despite the existence of multiple communications paths, all but one of the paths or links remain idle. Accordingly, the spanning tree algorithm results in a significant waste of system resources.

A mitigating solution to this problem of waste is for a network administrator to manually identify and combine the redundant links connecting two looped devices as described in the EtherSwitch Pro16 Installation and User's Guide dated May 1995 from Cisco Systems, Inc. More specifically, the administrator may issue requests for status messages to the intermediate devices. By reviewing the information received from the intermediate devices, the administrator may be able to identify the lo existence of redundant links or paths between two intermediate devices. Once identified, the administrator may issue configuration messages instructing the intermediate devices to combine the redundant physical links. Thereafter, upon execution of the spanning tree algorithm, these network devices will treat the redundant links as a single link. That is, the spanning tree algorithm will not detect multiple links forming a loop. The system administrator may also configure these intermediate devices to forward frames across each physical link.

This solution is disadvantageous for several reasons. First, it requires substantial involvement of the network administrator and is thus time-consuming and expensive to implement. In particular, the combination of links must be reviewed by the network administrator every time the network topology changes (e.g., a cable is added/removed, a device is added or moved, a device fails or recovers, etc.). Second, the solution is highly error prone. That is, the administrator may incorrectly identify a loop, may issue configuration messages to the wrong devices or ports, etc. These errors may generate serious network problems that may be difficult to detect.

SUMMARY OF THE INVENTION

It is an object of the present invention to provide a protocol that aggregates redundant links in a computer network.

It is a further object of the present invention to provide a protocol that transparently aggregates redundant links.

It is a further object of the present invention to provide a protocol that dynamically aggregates and releases redundant links in response to network topology changes.

It is a further object of the present invention to reduce the adverse effects following network reconfigurations.

It is a further object of the present invention to provide a protocol that is compatible with non-enabled devices (i.e., devices that do not execute the protocol).

Briefly, the invention comprises a port aggregation protocol (PAGP) for dynamically aggregating redundant links connecting two neighboring devices in a computer network through the exchange of novel aggregation protocol data unit (AGPDU) frames between the devices. Each AGPDU frame contains, among other information, a unique identifier corresponding to the device sourcing the AGPDU frame and a port number corresponding to the port of the device through which the frame was sourced. In accordance with the invention, the exchange of AGPDU frames allows neighboring devices to determine whether they are interconnected by redundant links and, if so, to identify those ports corresponding to the redundant links. As discussed herein, each device may then dynamically aggregate the corresponding ports into an aggregation port (agport) which appears as a single, logical, high-bandwidth port or interface to other processes executing on the device.

In the illustrative embodiment, the PAGP protocol is implemented by means of a novel state machine engine executing at each port of a device. Preferably, the state machine engine includes at least five port states (i.e., idle, transmission, linked, available and aggregated) that transition in response to (i) receipt of an AGPDU frame and (ii) the contents of that received frame. For example, the idle state corresponds to an inoperable link associated with the port. Thus, if the port has not received any frame including an AGPDU frame, because, for example, the link coupled to the port is not yet capable of carrying information, the port remains in the idle state.

When the link is rendered operational as evidenced by a hardware event, such as a "carrier detect" signal, the port enters the transmission state. In this state, the state machine engine begins generating and forwarding AGPDU frames through the port. The engine also awaits the receipt of AGPDU frames from any neighboring devices. Upon receiving such a frame, the port transitions to the linked state. Here, the contents of the received AGPDU frame, including the unique identifier and port number of the neighboring device, are examined and copied into a partner table associated with the receiving port. This information, identifying the neighboring device and its port, is also entered into subsequent AGPDU frames forwarded through this port.

Upon receiving an AGPDU frame at a first port indicating that the neighboring device has received an AGPDU forwarded from the first port, the first port preferably transitions to the available state. That is, the state machine engine associated with the first port examines the contents of each received AGPDU looking, in part, for its own unique identifier and port number as entered by the neighboring device. When such an AGPDU frame is received and assuming that no AGPDUs have been received at the first port from any other neighboring devices, the first port determines that it is coupled to a single port of a single neighboring device (i.e., the first port is "directly coupled") and transitions to the available state.

In the available state, the first port awaits receipt of a second AGPDU frame containing its unique identifier and port number from the neighboring device, thereby confirming that the neighboring device has received at least one AGPDU frame forwarded from the first port. Upon receiving the second AGPDU, the first port's state machine engine attempts to aggregate the port. More specifically, the engine interrogates the device's other ports to determine which, if any, are also directly coupled to the neighboring device. Preferably, the engine examines the other port's partner tables. If a second port directly coupled to the same neighboring device and also in the available state is identified, both ports transition to the aggregated state and are aggregated into a single agport. In addition, the corresponding two ports on the neighboring device are similarly aggregated into a single agport. Thereafter, only these agports are "visible" to other processes executing on the devices.

An advantage of the present invention is that the PAGP protocol operates transparently to higher-level device applications. That is, most processes executing on a device are not aware of the underlying, individual physical ports that comprise an agport. Accordingly, other processes such as the spanning tree algorithm, only "see" the agports and thus none of the underlying ports are individually placed in a blocking mode. Nonetheless, the state machine engines allow data frames to be efficiently forwarded by the devices to or from any of the underlying physical ports of the agport. If one of the redundant links fails, frames may be forwarded to and from the remaining link of the agport transparently to the processes executing on the devices. Furthermore, the spanning tree protocol is not forced to recalculate a new loop-free tree, thereby avoiding a loss of the filtering database information and the corresponding inefficiencies.

BRIEF DESCRIPTION OF THE DRAWINGS

The above and further advantages of the invention may be better understood by referring to the following description in conjunction with the accompanying drawings, in which:

FIG. 5B is a chart showing the events which trigger transitions among the states of FIG. 5A.

DESCRIPTION OF THE PREFERRED EMBODIMENT

Figure 2:
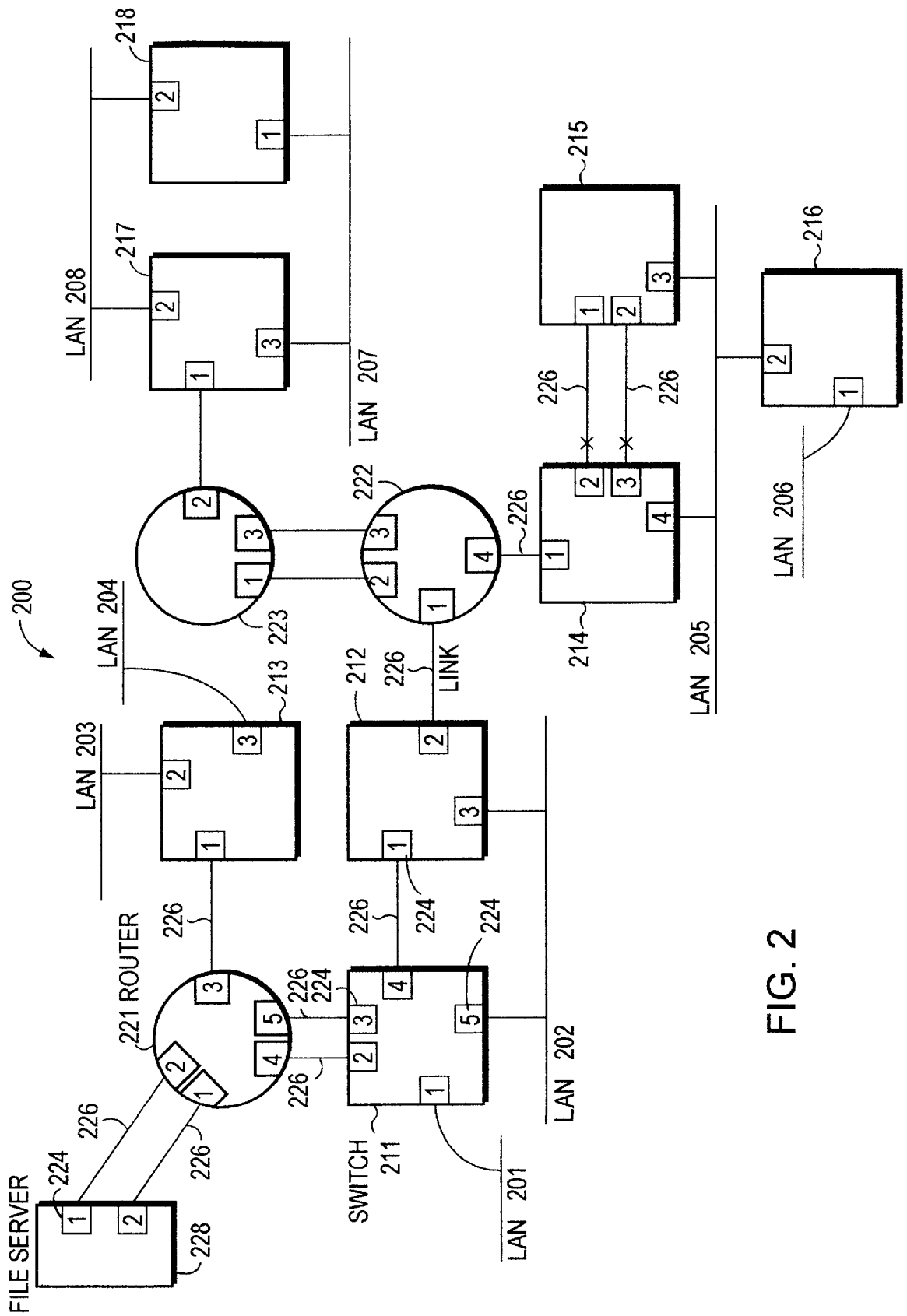
FIG. 2 is a highly schematic diagram of a computer network in accordance with the present invention.

FIG. 2 illustrates a computer network 200 in accordance with the present invention. The network 200 preferably comprises a plurality of local area networks (LANs) 201–208 interconnected by a plurality of intermediate devices, such as switches 211–218 and routers 221–223. One or more entities (not shown) are preferably coupled to each LAN 201–208 so that the entities may source or sink data frames to one another over the network 200. Each switch 211–218, moreover, preferably includes a plurality of ports 224 such that each LAN 201–208 (or entity) is coupled to at least one port 224 of switches 211–218.

Switches 211–218 and routers 221–223 are preferably interconnected by a series of links 226, such as point-to-point links. Routers 221–223 also preferably include a plurality of ports 224 such that links 226 couple to the ports 224 of the routers 221–223 and switches 221–218. The ports 224 may be IEEE 802-compatible physical ports, X.25 connections (a well-known connection-oriented protocol) and/or IP-encapsulated pipes in a router which can handle streams of data frames before requiring an acknowledgment. The network 200 may also include one or more servers, such as a file server 228. The file server 228 is connected to router 221 by two links 226. The file server 228, moreover, preferably includes at least two ports 224; one for each link 226 that connects the file server 228 to router 221.

It should be understood that the network 200 of FIG. 2 is meant for illustrative purposes only and that the present invention will operate with other networks having possibly far more complex topologies.

Each switch 211–218 and router 221–223 of network 200 preferably identifies its own ports 224, e.g., by port numbers one, two, three, etc. Switches 211–218 and routers 221–223 are thus able to associate specific ports with the LANs, switches, routers, servers, etc. coupled thereto. For example, switch 211 has identified its ports 224 as port numbers one through five. Port number one is associated with LAN 201, port numbers two and three are associated with router 221, port number four is associated with switch 212 and port number five is associated with LAN 202.

As shown, the network 200 includes redundant links interconnecting the switches 211–218 and routers 221–223. For example, switch 211 is connected to router 221 by two links 226 extending directly between the two devices. Switch 211 is also redundantly connected to switch 212 through LAN 202 and link 226 which extends directly between the two switches 211, 212. The existence of such redundant links prevents portions of the network 200 from becoming isolated should any constituent link fail.

The existence of such redundant links, however, creates loops in the network 200, which, as described above, are highly undesirable. The spanning tree algorithm which provides a loop-free network topology nonetheless wastes system resources. To avoid these disadvantages and to improve the efficient utilization of system resources, among other reasons, a plurality of devices (e.g., routers, switches, servers, entities, etc.) within network 200 preferably cooperate to provide a port aggregation protocol (PAGP). In the illustrated embodiment, the PAGP protocol is implemented in a state machine environment.

State Machine Environment

Figure 3:
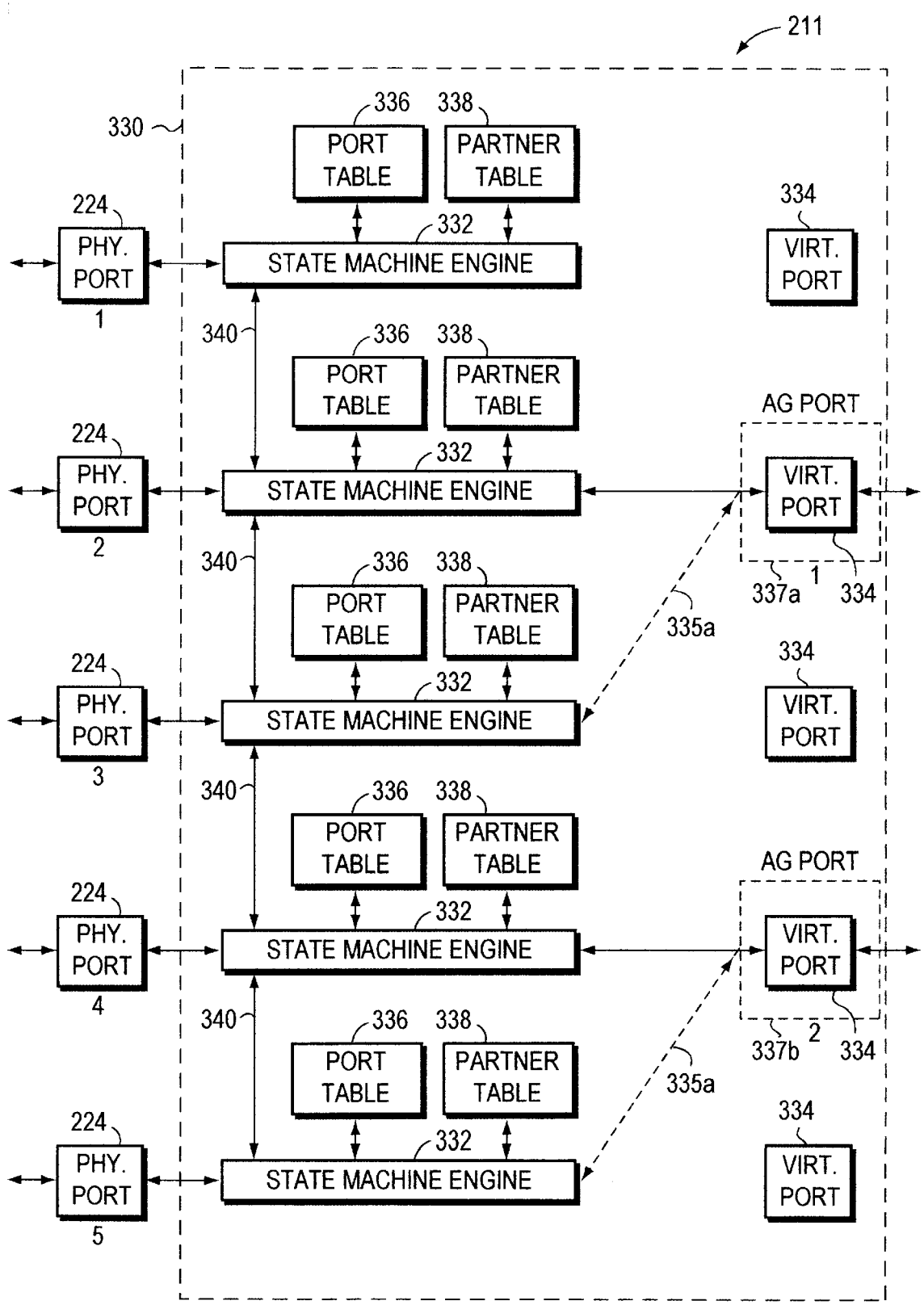
FIG. 3 is a partial block diagram of an intermediate device in accordance with a preferred embodiment of the present invention.

FIG. 3 is a partial block diagram of switch 211 configured as a state machine environment 330. Switch 211 includes a plurality of physical ports 224 coupled to LANs 201 and 202, switch 212 and router 221. Each physical port 224 of switch 211, moreover, is preferably identified by a specific number, e.g., port numbers one through five. The state machine environment 330 preferably includes a state machine engine 332 associated with each physical port 224 such that frames forwarded to and from the corresponding physical port 224 may be accessed by the associated state machine engine 332. The state machine environment 330 further includes a virtual port 334 associated with each physical port 224 and state machine engine 332.

One object of the port aggregation protocol is to construct suitable connections between the physical ports 224 and the virtual ports 332 via the engines 332, including connecting more than one physical port to file same virtual port (i.e., aggregating the ports). Once connected, frames forwarded onto a specific physical port 224, e.g., port number five, are conveyed via the state machine engine 332 to the virtual port 334 connected thereto. From the virtual port 334, the frames may be accessed by other processes or protocols executing at switch 211. Until a virtual port 334 is connected by one or more state machines 332, moreover, it appears to the higher-layer processes as an unconnected or open port.

The virtual ports 332 are thus layered "above" the physical ports 224 in a protocol stack. Higher-layer processes or protocols in the protocol stack bind to virtual ports 332 (or aggregation ports as discussed herein) and not to the physical ports 224. A switch suitable for use with the present invention is described in U.S. patent application Ser. No. 08/623,142 filed Mar. 28, 1996 and entitled INTER- SWITCH LINK MECHANISM FOR CONNECTING HIGH-PERFORMANCE NETWORK SWITCHES which is hereby incorporated by reference in its entirety.

In addition, each state machine engine 332 preferably communicates with an associated port table 336 and partner table 338, which, as discussed below, contain information relating to the PAGP protocol. It will be understood to those skilled in the art that the tables 336, 338 may be implemented as content addressable memory (CAM) devices and that the state machine engines 332 may comprise registers and combinational logic configured to produce sequential logic circuits. In the illustrated embodiment, the state machine engines preferably comprise programmed processing elements containing software programs pertaining to the methods described herein and executable by the processing elements. Other computer readable media may also be used to store and execute the program instructions. The engines 332 are also preferably arranged in communicating relationship by communications means, such as a bus 340.

It is further understood that the virtual ports 334 may alternatively represent virtual interfaces. Adjacent layers in a protocol stack are separated by an interface which defines the operations and services that the lower layer (e.g., data link) offers to the upper layer (e.g., internet protocol). The virtual interfaces provide operations and services through the underlying physical ports.

As described below, each state machine engine 332 generates aggregation protocol data unit (AGPDU) frames that are forwarded through the corresponding physical port 224. These AGPDU frames preferably contain information from the corresponding port tables 336. The state machine engines 332 similarly monitor their ports for the receipt of AGPDU frames forwarded from other devices within the network 200 (FIG. 2) and copy information contained in received AGPDU frames into their associated partner tables 338.

AGPDU Frame Format

Figure 4A:
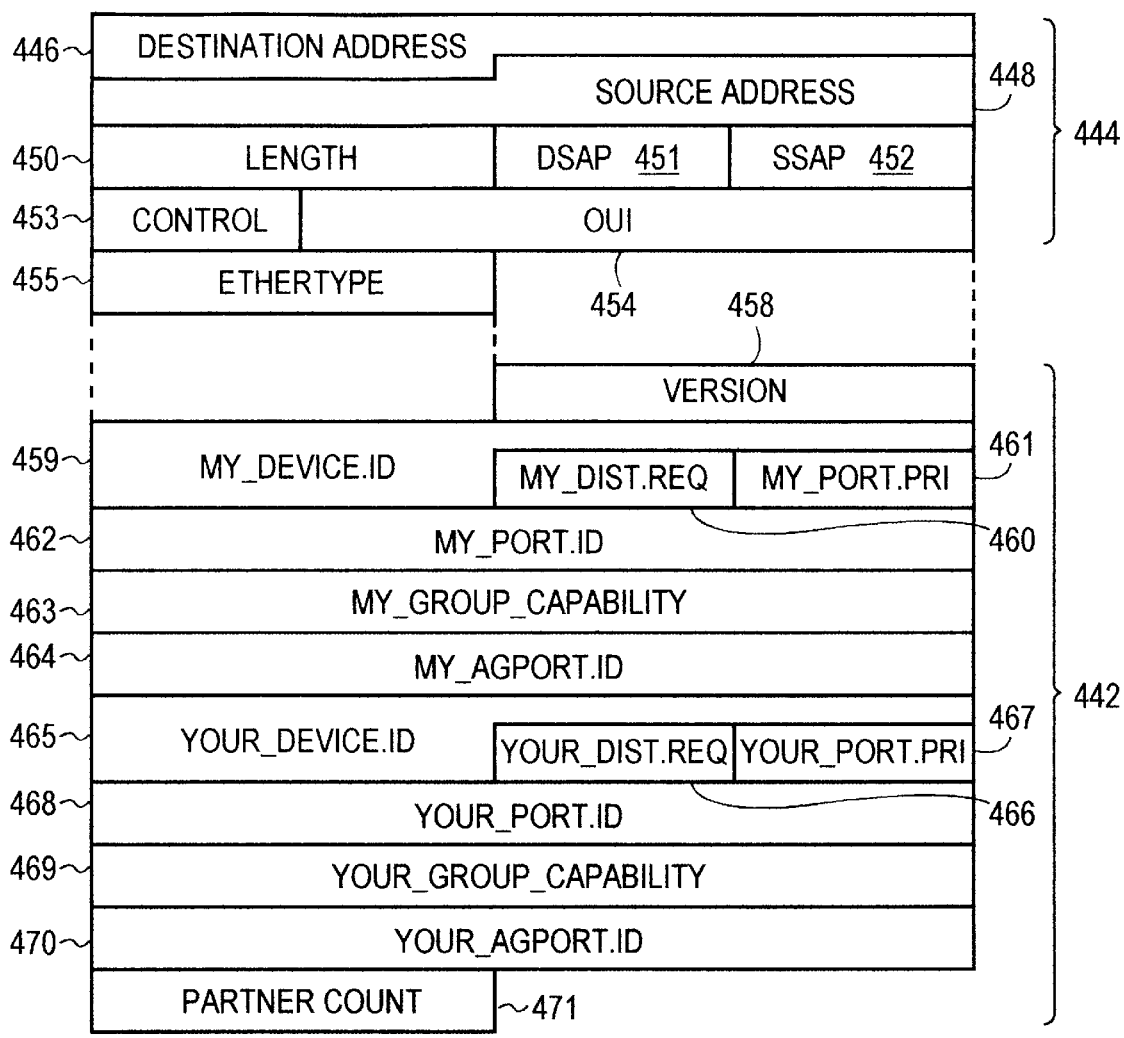
FIG. 4A is a block diagram of a preferred Aggregation Protocol Data Unit.

FIG. 4A is a block diagram of a preferred Aggregation Protocol Data Unit (AGPDU) frame 442. The AGPDU frame 442 is preferably attached to a header 444 that may be compatible with the Media Access Control (MAC) layer of a protocol stack implemented by the port sourcing the AGPDU frame 442 and/or by the network 200 (FIG. 2). The format of header 444 may correspond to a conventional Subnetwork Access Protocol (SNAP). In particular, header 444 preferably comprises a plurality of fields, including a destination address field 446 and a source address field 448.

The destination address field 446 may contain a multicast MAC address utilized by standard IEEE 802.1D bridge protocol data unit (PDU) frames. This ensures that AGPDU frames are received by each intermediate device in the network and yet are not transparently forwarded by those devices. AGPDU frames are preferably not forwarded to or from virtual ports 332 or, as discussed herein, aggregated ports. Those skilled in the art will understand that other destination addresses may alternatively be utilized. The source address field 448 preferably contains the MAC address of the physical port 224 sourcing the AGPDU frame 442.

Following the address fields 446, 448, are a length field 450, a destination service access point (DSAP) field 451, a source service access point (SSAP) field 452, a control field 453, an organization unique identifier (OUI) field 454 and an ethertype field 455. Fields 450–454 are defined by the SNAP protocol and well-known to those skilled in the art. The OUI field 454 and ethertype field 455 are preferably utilized together to identify the frame as an AGPDU frame 442.

Attached the header 444 is the AGPDU frame 442 which also includes a plurality of fields. In particular, a version field 458 contains information regarding the version of the AGPDU frame 442 being sourced and also indicates the frame is an AGPDU frame and not a FLAGPDU frame as described below. A my_device.id field 459 contains a value that globally and uniquely identifies the device sourcing the AGPDU frame 442 relative to the network 200 (FIG. 2). The my_device.id 459 may be a six character value in order to conform with standard 48-bit LAN addresses. The value stored in the my_device.id field 459, moreover, preferably refers to the sourcing device as a whole, e.g., switch 211. Thus, a device typically will have a single my_device.id for all AGPDU frames 422 forwarded by that device.

It should be understood that a device may have multiple network interface cards each having multiple physical ports. In this case, each network interface card may have its own my_device.id for use with all ports contained on that card. It may not be possible, however, to aggregate ports on two different network cards since the my_device.id's are different.

My_distribution.requirements field 460 and my_port.priority field 461 preferably contain information used to determine distribution of data frames among physical ports 224 (FIG. 3) that have been aggregated into an agport, as described below. The frame 442 also includes a my_port.id field 462 that stores a value (e.g., port number) corresponding to the particular physical port 224 through which the AGPDU frame 442 is sent. A my_group_capability field 463 contains information regarding whether the port may be aggregated with certain other ports, as discussed below. The contents of my_agport.id field 464 indicate whether the associated physical port 224 has been aggregated to an agport and, if so, an identifier corresponding to the agport.

The remaining fields of the AGPDU frame 442 preferably contain information obtained from a received AGPDU frame. More specifically, the AGPDU frame 442 includes a your_device.id field 465, a your_distribution.requirements field 466, a your_port.priority field 467, a your_port.id field 468, a your_group.capability field 469 and a your_agport.id field 470; each containing information similar to that stored in fields 459–464. Finally, the AGPDU frame 442 may include a partner count field 471 containing information relating to the number of devices and/or ports to which the port 224 sourcing the frame is presently coupled.

It should be understood that other data formats besides six character formats may be used in the my—device.id and your_device.id fields. It should be further understood that the AGPDU frame may contain fewer or additional fields. For example, rather than a partner count field, AGPDU frames may contain a list of addresses for each neighboring device.

Figure 4B:
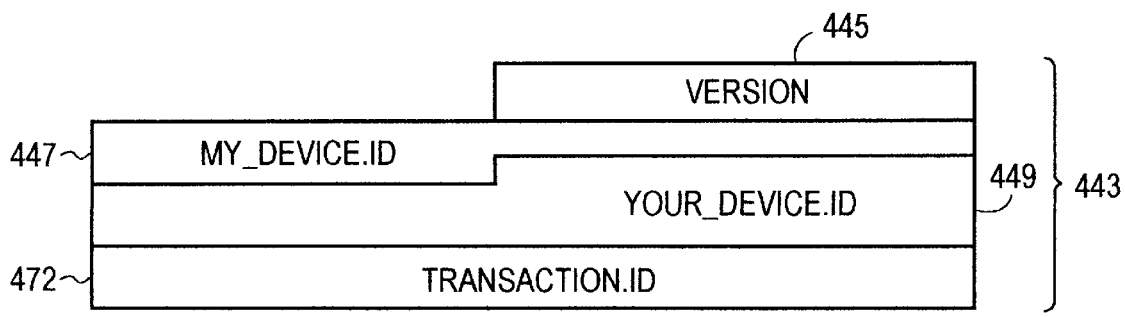
FIG. 4B is a block diagram of a preferred Flush Aggregation Protocol Data Unit.

FIG. 4B is a block diagram of a preferred Flush Aggregation Protocol Data Unit (FLAGPDU) frame 443. The FLAGPDU frame 443, as discussed below, may be used to ensure that frames are delivered in the same order as sent despite a change in physical ports used to source the frames. The FLAGPDU frame 443, which may also include an appended header 444 (FIG. 4A), comprises a plurality of fields such as a version field 445, a my_device.id field 447, a your_device.id field 449 and a transaction.id field 472. Version field 445 also identifies the frame as a FLAGPDU frame and not an AGPDU frame.

Creation of Agports/State Diagram

Figure 5A:
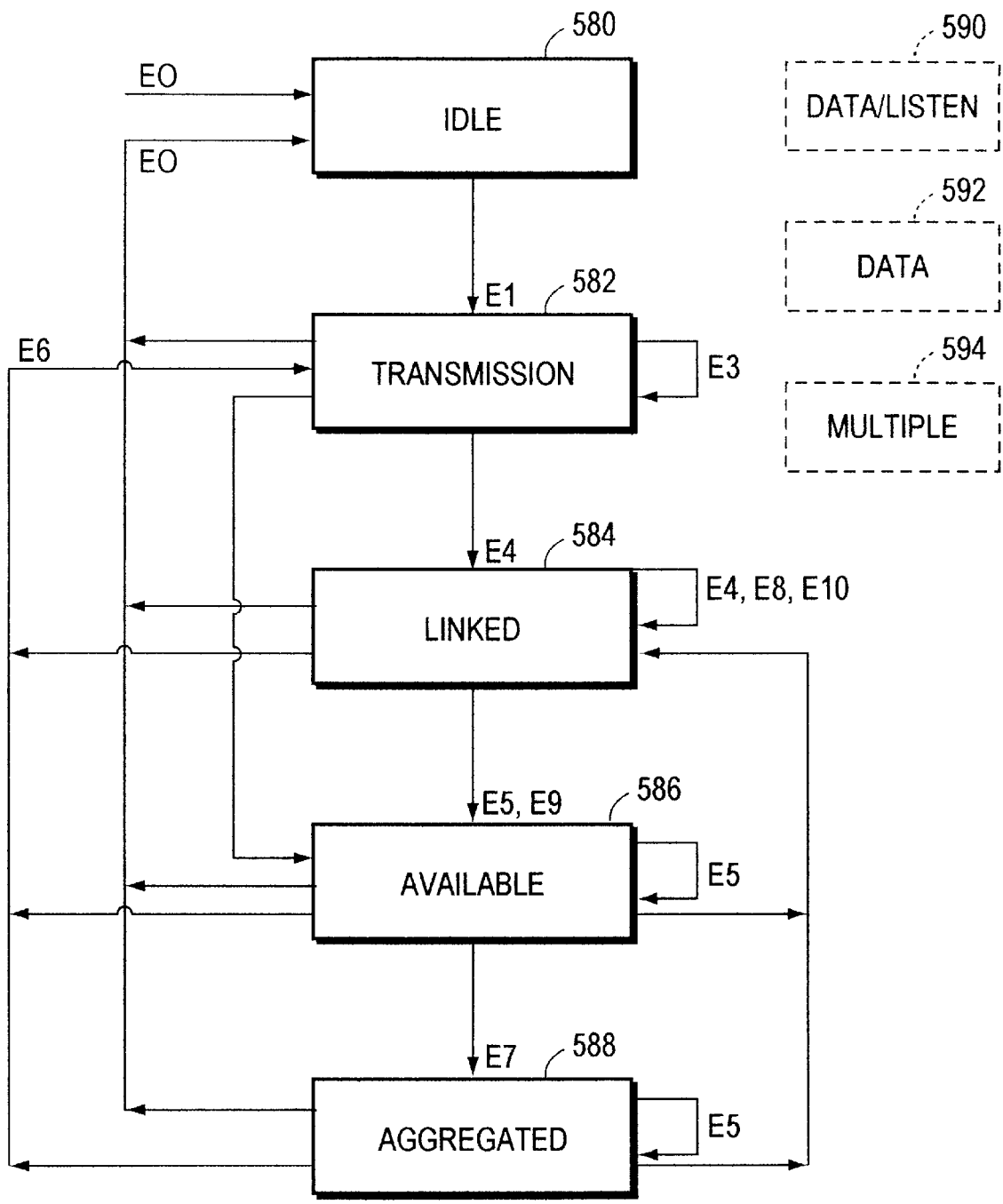
FIG. 5A is a state diagram in accordance with the present invention.

In response to receiving AGPDU frames and interpreting their contents, the ports 224 (FIG. 3) preferably transition among a plurality of states. FIG. 5A is a diagram of the various states that may be entered by the ports 224. The states preferably include an idle state 580, a transmission state 582, a linked state 584, an available state 586 and an aggregated state 588. Upon initialization of the corresponding device (e.g., switch 211), each port 224 "hibernates" in the idle state 580. Through execution of one or more conventional link-layer protocols, such as the Cisco Discovery Protocol (CDP) from Cisco Systems, Inc., a physical link or connection may be established at each port 224 of switch 211.

These protocols typically exchange "hello" messages in order to establish a physical link capable of carrying information, such as dater frames. The state machine engine 332 monitors the exchange of these messages to determine when the physical port 224 is rendered operational. Once it is, the port 224 preferably transitions from the idle state 580 to the transmission state 582. Physical layer means (e.g., "carrier-detect"), if available, may also cause the transition if no link-layer is used. That is, transition requires an AND function of the link and physical layers, if either or both are present.

It should be understood that the hello and "carrier-detect" messages may contain fields or flags which trigger port transition from the idle state 580 to the transmission state 582.

In the transmission state 582, the state machine engine 332 accesses its associated port table 336 to generate an AGPDU frame 442 for transmission through the corresponding port 224. The port table 336 is preferably configured with the unique identifier corresponding to the device 211 sourcing the AGPDU frame 442 and the port number (e.g., number two) assigned to the port 224. The unique identifier may, for example, be identical to the globally unique 48-bit IEEE MAC address of one of the device's physical ports (e.g., port number one). This information is loaded into fields 459 and 462 of frame 442. Since the state machine engine 332, in this example, has yet to receive any AGPDU frames, fields 464–471 contain invalid information, indicated by the partner count field 471 being set at "0". Header 444 is then attached to the AGPDU frame 442 and the frame 442 is forwarded through the physical port 224. Preferably, the state machine engine 332 is programmed to periodically (e.g., every one second) transmit a similar AGPDU frame through the physical port.

Since port number two of switch 211 is coupled to router 221 (FIG. 2) and assuming that router 221 is similarly enabled to send and receive AGPDU frames, then router 221 will receive the AGPDU frame 442 sent by switch 211 through port number two. Similarly, switch 211 will receive an AGPDU frame from router 221 on port number two. Assuming the received AGPDU was generated by router 221 before it received any AGPDU frames (including the frame transmitted by switch 211), fields 464–471 of the frame received at switch 211 will contain invalid information. Upon receipt of this AGPDU frame, port number two of switch 211 preferably transitions to the linked state 584. That is, receipt of an AGPDU frame that does not contain identifying information in fields 465–470 corresponding to the port on which the frame is received (i.e., the partner count is set at "0") preferably causes the port to transition from the transmission state 582 to the linked state 584.

In the linked state 584, the corresponding state machine engine 332 creates an entry (not shown) in the partner table 338 and enters the information from fields 459–464 of the received AGPDU. This step, moreover, is performed for each AGPDU frame received on the port 224. The partner table 338 thus contains a record of the unique device identifier and port number, among other information, for each received AGPDU frame. To prevent the information in the partner table 338 from becoming stale, a timer may be set each time an entry is added to the table 338. Upon expiration of the timer, the contents of the corresponding entry may be erased (e.g., reset to zero).

In addition, the state machine engine 332 at port number two continues to generate and send AGPDU frames at each predefined period. When generating the next AGPDU frame 442, the engine 338 loads fields 465–471 with information obtained from the partner table 338. That is, the state machine engine 332 preferably loads the unique device identifier and port number from fields 459 and 462 of the received AGPDU frame into the your_device.id and your_port.id fields 465, 468 of the AGPDU fame 442 to be forwarded through the port 224 (e.g., port number two). The state machine engine 332 similarly enters the corresponding information, if any, from table 338 into fields 466, 467, 469 and 470. Moreover, since the partner table 338 contains one entry (e.g., for router 221), the state machine engine 332 preferably sets the partner count field 471 to "1".

Router 221 similarly enters the information from received AGPDU frames into its corresponding partner table and copies this information into subsequent AGPDU frames sourced by router 221 through its port number four. Upon receiving an AGPDU frame at port number two of switch 211 that contains the unique identifier of switch 211 in field 468 and port number two in field 468, the port transitions from the linked state 584 to the available state 586. That is, transition from the linked state 584 to the available state 586 preferably occurs when a "self-identifying" AGPDU frame is received (i.e., a frame containing the unique identifier and port number in fields 465 and 468 corresponding to the port on which the frame is received). Transition from the linked to the available state also requires the partner count field 471 to be set to "1". If the partner count field 471 is set to a value greater than "1" (indicating that the sourcing device is coupled to more than one neighboring device or more than one port of the same device) or if the partner table associated with the port on which the AGPDU frame is received (e.g., port number two of switch 211) contains more than one entry, transition to the available state 586 is precluded. Thus, transition to the available state 586 only occurs where the port is connected to a single port of one neighboring device (i.e., "directly coupled").

It should be understood that if the first AGPDU frame received at port number two is a self-identifying AGPDU, then the port may transition from the transmission state 582 directly to the available state 586, by-passing the linked state 584 entirely.

Furthermore, upon receipt of each AGPDU frame from router 221, engine 332 accesses its partner table 338 to determine whether an entry already exists corresponding to router 221. If so, and if the information stored at this entry corresponds to the information in the newly received AGPDU frame, the engine 332 simply resets the timer associated with this entry. By resetting the timer, the engine 332 signifies that the information in table 338 corresponding to router 221 is current. If switch 211 stops receiving AGPDU frames from router 221 at port number two (e.g., the corresponding link fails), the timer would expire and the entry corresponding to router 211 would be erased. Furthermore, if no other AGPDU frames are received at port number two, the port 224 preferably transitions back to the transmission state 582.

When a second self-identifying AGPDU frame is received at port number two of switch 211, the associated state machine engine 332 attempts to aggregate the port. A port preferably waits for receipt of a second self-identifying AGPDU from the neighboring device to permit sufficient time to elapse in which to receive AGPDU frames from any additional devices that might be coupled to the port (e.g., port number two). Alternatively, the port may wait a preset time before attempting to aggregate.

To aggregate its port, the state machine engine 332 corresponding to port number two preferably interrogates the state machine engines 332 corresponding to the other ports (e.g., port numbers one, three, four and five) via bus 340 to determine whether any of the latter ports are similarly directly coupled to router 221 and also operating in the available or aggregated states 586, 588. If so, such links are redundant. In response to this interrogation, the engine 332 ascertains that port number three is also coupled to router 221 and operating in the available state 586. Meanwhile, port numbers four and five at router 221 similarly transition from the linked state 584 to the available state 586 and determine that they are both directly coupled to switch 211.

Having established that port numbers two and three of switch 211 and port numbers four and five of router 221 represent redundant links between those two neighboring devices, all four ports preferably transition to the aggregated state 588. Here, the redundant links are aggregated. In particular, the state machine engine 332 associated with port number three at switch 211 connects to the virtual port associated with port number two as shown by the dashed line 335, thereby aggregating the two ports into a single, logical agport 337a. The agport 337a, moreover, is assigned a unique agport identifier (e.g., agport number one) by the state machines 332.

It should be understood that upon reaching the aggregated state 588, a port may join an existing aggregation. That is, additional ports may join an agport without having to tear down and bring up the agport each time.

In the aggregated state 588, the respective ports of switch 211 and router 221 continue to exchange AGPDU frames. In addition, the state machine engines 332 associated with physical port numbers two and three at switch 211 insert the unique agport identifier (i.e., agport number one) into the my_agport.id field 464 of all subsequent AGPDU frames forwarded through port numbers two and three to router 221. Upon receipt, router 221 learns that these ports have been aggregated and copies the corresponding agport identifier into its partner tables. Similarly, router 221 via AGPDU frames informs the state machines associated with port numbers two and three at switch 211 of the unique identifier assigned to the agport formed by port numbers four and five at router 221. This information is entered into the corresponding partner tables 338 at switch 211 and preferably inserted into the your_agport.id field 470 in subsequent AGPDU frames forwarded from switch 211 to router 221.

If switch 212 is also executing the PAGP protocol, the states of port numbers one and three at switch 212 and port numbers four and five at switch 211 transition, as described above, from idle state 580 to transmission state 582 to the linked state 584 to the available state 586 and finally to the aggregated state 588. In the aggregated state 588, the state machine engine 332 corresponding to physical port number five at switch 211 connects as shown by dashed lines 335b to the virtual port 334 associated with port number four, thereby creating a single, logical agport 337b (e.g., agport number two). Similarly, port numbers one and three at switch 212 also form a single agport.

The state machine engine associated with physical port number one then attempts to connect to a virtual port 334. Assuming a failure exists in the connection between port number one and LAN 201, the corresponding state machine engine 332 remains in the idle state 580 and no connection is made between the engine 332 and any virtual port 334.

At this point, the state machine engines 332 at switch 211 will have connected each operational physical port to a virtual port 334. Other processes executing on switch 211 communicate with network 200 only through the virtual or agports. That is, the other processes will consider switch 211 to be connected to the network 200 through only two ports (agport numbers one and two). To communicate with router 221, these processes utilize the services of agport number one. Similarly, to communicate with switch 212, the processes utilize agport number two.

If the failure at physical port number one is subsequently repaired, the associated state machine engine 332 will transition to the transmission state 582 and begin generating and forwarding AGPDUs. Since physical port number does not represent a redundant link, the state machine engine 332 will simply connect to its associated virtual port 334. Other processes executing at switch 211 may thus communicate to entities on LAN 201 through this virtual port.

Figure 1:
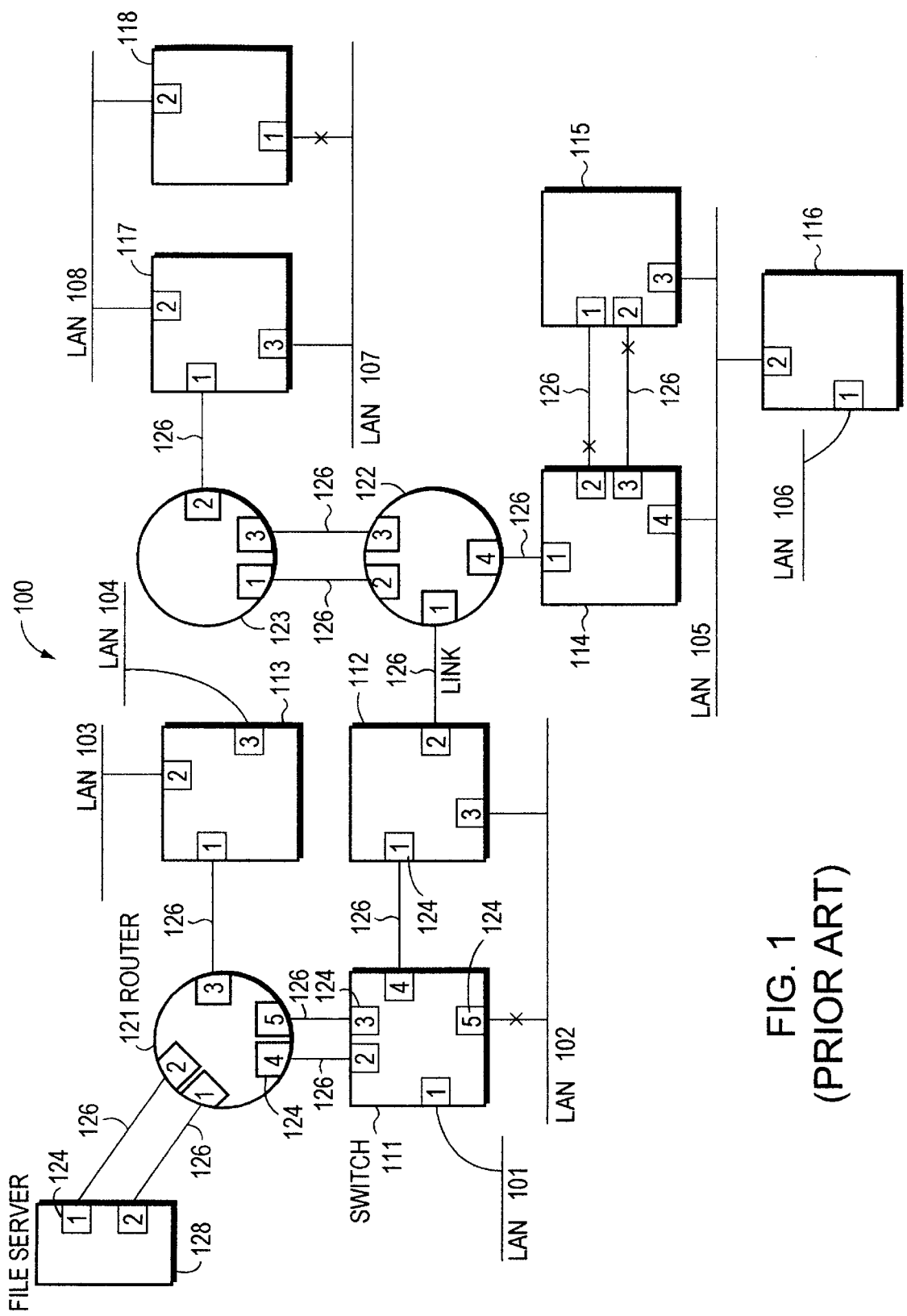
FIG. 1, previously discussed, is a highly schematic diagram of a conventional computer network.

Aggregating ports associated with redundant links between neighboring devices preserves substantial system resources. For example, execution of the spanning tree algorithm (which runs "above" the PAGP protocol in the protocol stack) does not result in individual physical ports of an agport being blocked. That is, BPDU frames created by the spanning tree algorithm at switch 211 are forwarded through agport number two and, significantly, identify agport two, not the underlying physical port numbers four and/or five. Similarly, at switch 212, BPDU frames are forwarded through the agport created by aggregating physical port numbers one and three. Rather than "seeing" two links from switch 211 to switch 212 (e.g., through physical port numbers four and five and one and three, respectively), the spanning tree algorithm sees a single port, agport number two, connecting switch 211 to switch 212. With only one link connecting switch 211 with switch 212 (i.e., agport number two), there is no reason to sever any connection. Thus, physical port number four at switch 211 is not placed in the blocking mode as in the prior art network 100 (FIG. 1).

It should be understood that in certain network topologies the spanning tree algorithm may nonetheless result in an entire agport being placed in the blocking mode.

Utilization of the PAGP protocol also results in "fast recovery" following a link failure, removal or even a link recovery. For example, failure of a link aggregated under PAGP generally results in the associated physical port being released from the corresponding agport. Since the spanning tree protocol effectively runs "above" PAGP, it does not sense the loss of the failed link and thus will not require a new loop-free tree to be calculated. Accordingly, information in the filtering database is not timed-out and data frames are not flooded through the network.

FIG. 5B is an event table illustrating a plurality of events E0–E10 and the transition of states 580–588 in response to those events. As noted, event E2 corresponds to the receipt of non-AGPDU frames, such as data frames, at the corresponding port and, as shown, receipt of non-AGPDU frames does not cause a change in state. Event E8 corresponds to the receipt of an AGPDU frame from a second neighboring device. That is, the received AGPDU frame has a my_device.id and/or my_port.id that differs from the previously received AGPDU frames. This may occur where the port is coupled to a shared medium and a new PAGP-enabled device is "plugged-in" to that medium. In response to this second AGPDU, the port transitions back to the linked state from either the available state 586 or the aggregated state 588. Whenever a port 224 transitions from the aggregated state 588, the corresponding state machine engine 332 releases the corresponding agport and re-establishes its connection with its associated virtual port 334.

Event E9 corresponds to all but one of the entries in the partner table 338 timing out. For example, all but two PAGP-enable devices may be removed from a shared medium. Since the corresponding ports are now each coupled to a single, neighboring device (i.e., directly coupled), the ports preferably transition from the linked state 584 to the available state 586. Event E6 corresponds to all of the information in the partner table 338 timing out. This may occur if all but one of the devices on a shared medium are removed. Since the corresponding physical port of the remaining device is no longer coupled to a single device sourcing AGPDU frames, the port transitions to the transmission state 582 and continues to send and listen for AGPDU frames.

It should be understood that other states in addition to those listed above may be utilized by the ports. In a preferred embodiment, for example, the ports may include a data/listen state 590 (shown in phantom) in which the port is receiving only non-AGPDU frames. Here, the port continues to generate and forward AGPDU frames through the port. In addition, a data state 592 (shown in phantom) corresponds to the port receiving non-AGPDU frames after having waited the preset time (e.g., three seconds) without receiving any AGPDU frames. In the data state 592, the physical port is connected to its associated virtual port, forwards non-AGPDU frames to and from the virtual port and continues to listen for AGPDU frames.

The state machine engines may additionally be programmed to slow down the rate at which AGPDU frames are sourced if no AGPDU frames are received through the corresponding port after a preset time (e.g., three seconds). This prevents the PAGP protocol from wasting communications bandwidth. The state machines nonetheless continue to listen for AGPI)U frames and, if an AGPDU frame is received when the port is in the transmission state 582, the data/listen state 590 or the data state 592, the port preferably transitions to the linked or available states 584, 586 and begins or resumes generating and forwarding AGPDU frames at the original rate in an effort to establish an agport.

It should be understood that the AGPDU frames may contain flags (not shown) which, if set, direct the receiving device to alter its rate of transmission of AGPDUs.

The ports may also include a multiple state 594 (shown in phantom) in which the port receives AGPDU frames from more than one device and has multiple entries in the corresponding partner table 338. In the multiple state 594, the port is not aggregated with any other ports but forwards frames (including AGPDU and non-AGPDU frames) to and from the port. If all but one of the entries in the partner table 338 time-out, the port preferably transitions from the multiple state 594 to the linked state 584.

Referring to FIG. 2, port number four of switch 214 is coupled to port number two of switch 216 and port number three of switch 215 via LAN 205. If switches 215 and 216 forward AGPDU frames from their port numbers three and two, respectively, the partner table associated with port number four at switch 214 contains two entries and the partner count field 471 of AGPDU frames 442 forwarded by switch 214 through port four is set to "2". Port number two is thus prevented from transitioning to the aggregated state 588. Furthermore, even assuming redundant links 226 between switches 214 and 215 are aggregated, a loop exists by virtue of LAN 205. Accordingly, the spanning tree algorithm executing in this segment of the network may block the agport comprising port numbers two and three of switch 214.

The partner count field 471 of the AGPDU frame 442 may also be used to identify devices on a shared medium that erroneously operate in the transmit-only or receive-only mode. For example, if four PAGP-enabled devices are coupled to a shared medium, the partner count field 471 of the AGPDU frames sourced by each device should be set at "3". If the field 471 is set to "0", the sourcing device is likely in transmit only mode, which may be corrected by disabling the link and notifying the system administrator. Similarly, if the contents of the partner count stored in the port table 336 for a given physical port is incremented from that stored in the partner count field 471 of received frames, that port is likely in receive only mode. In response, the state machine engine 332 preferably prevents the port from being aggregated.

Preferably, the PAGP protocol also allows the physical ports 224 and corresponding virtual ports 334 of an intermediate device to be configured into various groups. The physical ports or interfaces of certain intermediate devices, such as routers, for example, may be individually configured to support various protocols at the physical or data link layers of the protocol stack. These various protocols, moreover, may not be compatible with one another. That is, router 221 (FIG. 2) having five physical ports (e.g., port numbers one through five ) may be configured such that port numbers one and two operate at one data speed whereas port numbers three through five operate at another speed. In addition, port numbers one through three may be configured to operate in accordance with the point-to-point protocol (PPP), whereas port numbers four and five may be configured pursuant to the AppleTalk Remote Access Protocol (ARAP). PPP and ARAP are well-known and documented protocols. Due to these differing configurations, it may not be desirable (or possible) to aggregate such physical ports.

As discussed above, the AGPDU frame 442 (FIG. 4) preferably includes the my_group_capability field 463. This field 463 contains a value corresponding to the group membership of the corresponding physical port 224 (FIG. 3). Continuing with the above example, AGPDU frames 442 generated by the router 221 at physical port numbers one and two may set the my_group_capability field 463 to "1", port number three may set the field 463 to "3" and port numbers four and five may set the field to "4". These values may be stored in the corresponding port tables 336 upon configuration of the corresponding device. Thereafter, when any of these ports enter the available state 586 (FIG. 5), the corresponding state machine engine 332 searches the other state machine engines for a port that not only is in the available or aggregated states and coupled to the same device, but also has the same group membership value. Thus, physical port number one cannot be aggregated with physical port number five, even assuming both physical ports were redundantly linked to the same neighboring device, since the group membership values assigned to the two ports do not match.

The state machine engines also examine the your_group capability fields 471 to ensure that the ports of the neighboring device are members of the same group. If not, the ports are preferably not aggregated at either device.

It should be understood that, although the group capability has been described in reference to router interfaces, the physical ports of a switch or any other device, server or entity may be similarly grouped. It should be further understood that group membership values may be static or dynamic. That is, the group membership value for a given port may change in response to an AGPDU frame received at that port.

Data Forwarding Schemes Across Agports

Once a plurality of physical ports 224 (e.g., port numbers two and three of device 211) are aggregated into an agport, e.g., agport number one, frames received from higher level processes will queue up in a single data stream at the agport. The frames may then be distributed among the corresponding state machine engines in a variety of known ways and forwarded through the associated physical ports. With the two physical ports 224 (port numbers two and three) aggregated into a single agport (agport number one), moreover, a single MAC address is preferably utilized with frames forwarded from the agport. If the two physical ports 224 utilize the same MAC- address (e.g., a MAC address corresponding to the device), then this MAC address may also be used by the agport. If the two ports 224 utilize separate MAC addresses, then a single MAC address is selected for the agport. The selected MAC address may be either one of the MAC addresses corresponding to the physical ports or some other MAC address. Again, the MAC address corresponding to the device may be selected.

Frames may be distributed, for example, pursuant to a hot-standby method. In hot-standby, one physical port of an agport is selected by the state machine engines as the primary physical port. The remaining physical ports are designated as standby ports. All frames received at the agport are forwarded through the single primary physical port. In the event of a failure of the primary physical port (e.g., a link failure), one of the standby ports may be selected by the state machine engines to become the new primary physical port. This transition occurs essentially transparently to processes executing on the device "above" the PAGP protocol, such as the spanning tree protocol.

The format of the AGPDU frame preferably includes a field that may be used to identify a particular data forwarding scheme. More specifically, if a device is only capable of forwarding frames pursuant to a particular forwarding scheme (e.g., destination address, source address, hot-standby), information identifying that scheme may be inserted in the my distribution.requirements field 460 of AGPDU frames sourced by that device. For example, a device may require that all frames having a given MAC source address be forwarded by the neighboring device over the same physical port; a value representing this requirement is then loaded into field 460.

In addition, if a hot-standby frame distribution mode is desired, then my_port.priority field 461 may be used to assign a unique priority to each physical port within a given group. That is, if port numbers one through four of a device have the same group membership, then each port may be assigned a unique priority value (e.g., a-d). The unique priority value is inserted in my_port.priority field 461 of each AGPDU frame sourced through the corresponding port. If port numbers one through four are subsequently aggregated into a single, logical agport, the physical port having the highest priority value (e.g., "a") may be selected as the primary physical port. If the port priority assigned by the ports of two redundantly linked devices conflicts, the priority corresponding to the device having the higher device ID determines which link becomes the primary link.

It should be understood that the information inserted into fields 460 and 461 may be stored in the corresponding port table 336.

All frames received through a physical port coupled to an agport (except for AGPDU frames) are delivered to the agport by the state machines. The received frames, moreover, are preferably provided to the corresponding agport in a single queue for access by the other processes executing on the device.

Fields 460 and 461 may also be used to transmit information regarding "pre-sorting" techniques to be implemented by a receiving device. For example, where two or more links have been aggregated, one link may be dedicated to transmitting only "high priority" data, e.g., multimedia, audio or video frames. By setting fields 460 or 461 in a predefined manner and transmitting an AGPDU, a receiving device may instruct a directly coupled device to place all high priority frames sent to the receiving device on the designated link. In response, the receiving device processes all frames received on the designated link before acting on frames received on the other aggregated links. That is, high priority frames are immediately moved to the corresponding agport ahead of even previously received "low priority" frames. Once all of the high priority frames have been moved to the agport, the receiving device returns to processing the low priority frames.

It should be understood that information regarding pre-sorting techniques may be transmitted by other fields, including new fields added to the AGPDU frame.

The AGPDU frames may also be used to transmit filtering rules for the ports that have been aggregated. For example, certain frames may be filtered (i.e., discarded) upon receipt at a receiving device. To reduce unnecessary traffic, the receiving device may instruct the directly coupled device not to transmit such frames. Accordingly, these frames which would only be filtered upon receipt are prevented from even traversing the aggregated links. These instructions, moreover, may be inserted into fields, such as fields 460, 461, 466, 467 or new fields dedicated to carrying such instructions, of the AGPDUs.

Referring again to FIG. 2, assume that port numbers one and two at router 221 and port numbers one and two at file server 228 (corresponding to the redundant links 226) are aggregated into an agport at router 221 and file server 228. The file server 228, moreover, selects a single MAC address corresponding to the agport formed by physical port numbers one and two. This MAC address is propagated to entities on LANs 201–204 for use in requesting services of the file server 228.

If the link 226 corresponding to port number one at the file server 228 fails, entities at LANs 201–204 may still communicate with the file server 228 using the PAGP protocol. Since, frames subsequently received at router 221 reference the single MAC address assigned to the agport at file server 228, these frames are provided to the agport at router 221 for forwarding to the file server 228. The state machine engines at the router 221 determine that the link coupled to their physical port number two is not operational and forward all frames through port number one. These frames are then received at port number two of the file server 228. Thus, to communication between LANs 203 and 204 and the file server 228 continues with minimal disruption despite the failure of the link 226 at port number one of the file server 228.

The FLAGPDU 443 (FIG. 4B) is preferably utilized during frame forwarding operation to prevent out of order delivery of a sequence of frames when a device switches to a new physical port, because of congestion in an old port. Before switching to the new physical port, the state machine engine generates and inserts a FLAGPDU frame 443 at the end of a queue holding frames destined for the old (e.g., congested) physical port/link. The FLAGPDU 443 is addressed to the neighboring device and contains a defining value in the transaction.id field 472. After inserting the FLAGPDU 443 in the queue of the old port/link, the sending device suspends queuing of additional frames until all of the queued frames are transmitted. Upon receipt of the FLAGPDU frame 443, the neighboring device returns it to the sending device which examines the contents of the transaction.id field 472. If the contents reflect the defining value, the sending device "knows" that all of the frames have been "flushed" through the old, congested port/link and begins transmission of the additional frames through the new port/link, thereby avoiding out-of-order frame delivery.

It should be understood that the PAGP protocol may be executed by intermediate devices, such as switches, routers, etc., and by other devices, such as servers, entities, etc. It should be further understood that each agport and each physical port may have its own set of conventional Simple Network Management Protocol (SNMP or SNMPv2) objects (i.e., statistics) for management by a system administrator. SNMP and SNMPv2 are well-known protocols that allow the system administrator to monitor and manage computer networks.

In sum, execution of the PAGP protocol results in the dynamic aggregation of the largest number of ports provided that: (1) the ports are either in the available or aggregated states; (2) the partner's device identifiers all match; (3) the partner's group capability fields all match; and (4) the ports group capability fields all match.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A computer readable medium containing executable program instructions for aggregating a plurality of redundant links connecting corresponding physical ports of neighboring devices in a computer network, the executable program instructions comprising program instructions for:

forwarding one or more aggregation protocol data unit (AGPDU) messages at each of two or more physical ports of a first device for receipt by one or more neighboring devices, each AGPDU message including a unique device identifier corresponding to the first device and a port identifier corresponding to the port from which the respective AGPDU message is forwarded;

in response to receiving one or more AGPDU messages from a given neighboring device, determining whether two or more physical ports of the first device are directly coupled to two or more physical ports of the given neighboring device by respective redundant links;

aggregating the two or more physical ports of the first device that are directly coupled to the given neighboring device into a single, logical aggregation port; and in response to receiving, at a first physical port of the first device, an AGPDU message that contains a unique identifier and a port number corresponding to the neighboring device and physical port from which the AGPDU message was sent, inserting the neighboring device's port number and unique identifier into one or more AGPDU messages forwarded from the first physical port of the first device.

2. The executable program instructions of the computer readable medium of claim 1 wherein the program instructions for determining further comprise:

storing information contained in the one or more AGPDU messages received from the given neighboring device at the two or more physical ports in a memory structure; and reviewing the stored information to determine whether two or more physical ports of the first device are directly coupled to two or more physical ports of the given neighboring device.

3. The executable program instructions of the computer readable medium of claim 2, wherein each AGPDU message received from a neighboring device includes a unique identifier corresponding to the neighboring device that sourced the respective AGPDU message, wherein the program instructions for storing further comprises storing the unique identifier contained within received AGPDU messages, and wherein the program instructions for determining further comprises identifying two or more physical ports at which AGPDU message having the same unique identifier were received.

4. The executable program instructions of the computer readable medium of claim 1 comprising further program instructions, in response to aggregating the two or more physical ports, for forwarding AGPDU messages less frequently through the respective two or more physical ports.

5. An intermediate network device for use in forwarding messages in a computer network, the computer network including one or more devices configured to transmit aggregation protocol data unit (AGPDU) messages, each AGPDU message carrying a device identifier and a port identifier that correspond to the device transmitting the AGPDU and the port through which the AGPDU is transmitted, the intermediate network device comprising:

a plurality of physical ports in communicating relationship with the one or more AGPDU-capable devices;

one or more aggregation state machine engines configured to capture and process AGPDU messages received at the physical ports; and at least one memory structure accessible by the one or more aggregation state machine engines, wherein, in response to receiving an AGPDU message from a first neighboring device at a first physical port, the one or more aggregation state machine engines copy at least the device and port identifiers from the received AGPDU message into the at least one memory structure, and further wherein the one or more aggregation state machine engines access the at least one memory structure to determine whether other physical ports have received AGPDU messages from the first neighboring device.

6. The intermediate network device of claim 5 further wherein, in response to determining that two or more physical ports at the intermediate network device are directly coupled to the first neighboring device, the one or more aggregation state machine engines aggregate the corresponding physical ports into a single, logical aggregation port.

7. An intermediate network device for use in forwarding messages in a computer network, the network device comprising:

a plurality of physical ports for forwarding messages; and at least one message generator in communicating relationship with at least one of the physical ports, the at least one message generator configured to generate one or more aggregation protocol data unit (AGPDU) messages for use in determining whether the network device is directly coupled to a neighboring network device through two or more redundant links, the AGPDU messages comprising:

a first field for carrying a device identifier corresponding to the intermediate network device;

a second field for carrying a port identifier corresponding to the physical port through which the AGPDU is forwarded;

a third field for use in carrying a unique device identifier from a received AGPDU message; and a fourth field that may contain a port identifier from the received AGPDU message.

8. The AGPDU message of claim 7 further comprising a fifth field for carrying a value associated with the number of neighboring devices to which the physical port is connected.

9. The AGPDU message of claim 8 further comprising one or more additional fields for carrying information associated with a particular data forwarding scheme to be utilized upon aggregation of the physical port through which the AGPDU is forwarded.

10. The AGPDU message of claim 9 further comprising a sixth field for carrying a value associated with the corresponding aggregation port.

11. The AGPDU message of claim 10 further comprising a seventh field for carrying a value identifying a particular configuration of the physical port through which the AGPDU is forwarded.

12. The AGPDU message of claim 11 further comprising an eighth field for carrying information relating to one or more filtering rules to be implemented by the device receiving the AGPDU.

13. The AGPDU message of claim 12 further comprising a ninth field for carrying information relating to one or more pre-sorting techniques to be implemented by the neighboring device receiving the AGPDU.

14. An intermediate network device for use in forwarding messages in a computer network, the network device comprising:

a plurality of physical ports for forwarding messages; and at least one state machine engine in communicating relationship with at least one of the physical ports, the at least one state machine engine configured to capture and process aggregation protocol data unit (AGPDU) messages received at the at least one physical port so as to determine whether the network device is directly coupled to a neighboring network device through two or more redundant links, the received AGPDU messages comprising:

a first field for carrying a device identifier corresponding to the intermediate network device;

a second field for carrying a port identifier corresponding to the physical port through which the AGPDU is forwarded;

a third field for use in carrying a unique device identifier from a received AGPDU message; and a fourth field that may contain a port identifier from the received AGPDU message.

15. The AGPDU message of claim 14 further comprising a fifth field for carrying a value associated with the number of neighboring devices to which the physical port is connected.

16. An intermediate network device for use in forwarding messages in a computer network, the computer network including one or more devices capable of transmitting aggregation protocol data unit (AGPDU) messages containing information, the intermediate network device comprising:

a plurality of physical ports in communicating relationship with the one or more AGPDU-capable devices; and a plurality of aggregation state machine engines, each engine associated with a corresponding physical port and configured to capture and process AGPDU messages received at the corresponding physical port and to transition the physical port among one of idle, transmission, linked, available and aggregated states, in response to the receipt of AGPDU messages and the information contained therein, wherein the idle state corresponds to a physical port unable to transmit messages, the transmission state corresponds to a physical port able to transmit AGPDU messages, the linked state corresponds to the receipt of at least one AGPDU message from a given neighboring device that fails to indicate that the given neighboring device has received an AGPDU message, the available state corresponds to the receipt of at least one AGPDU message from the given neighboring device indicating that it has received an AGPDU message from the intermediate network device, and the aggregated state corresponds to the receipt, at two or more physical ports, of at least two AGPDU messages from the given neighboring device each indicating that it has received AGPDU messages from the intermediate network device.

17. The intermediate network device of claim 16 further comprising:

a plurality of virtual ports each corresponding to a respective physical port; and means for connecting the two or more physical ports in the aggregating state to the same virtual port.

* * * * *